A. O. ABBOTT, Jr.
GAUGE.
APPLICATION FILED JUNE 15, 1921.
1,409,907.
Patented Mar. 21, 1922.
2 SHEETS—SHEET 1.
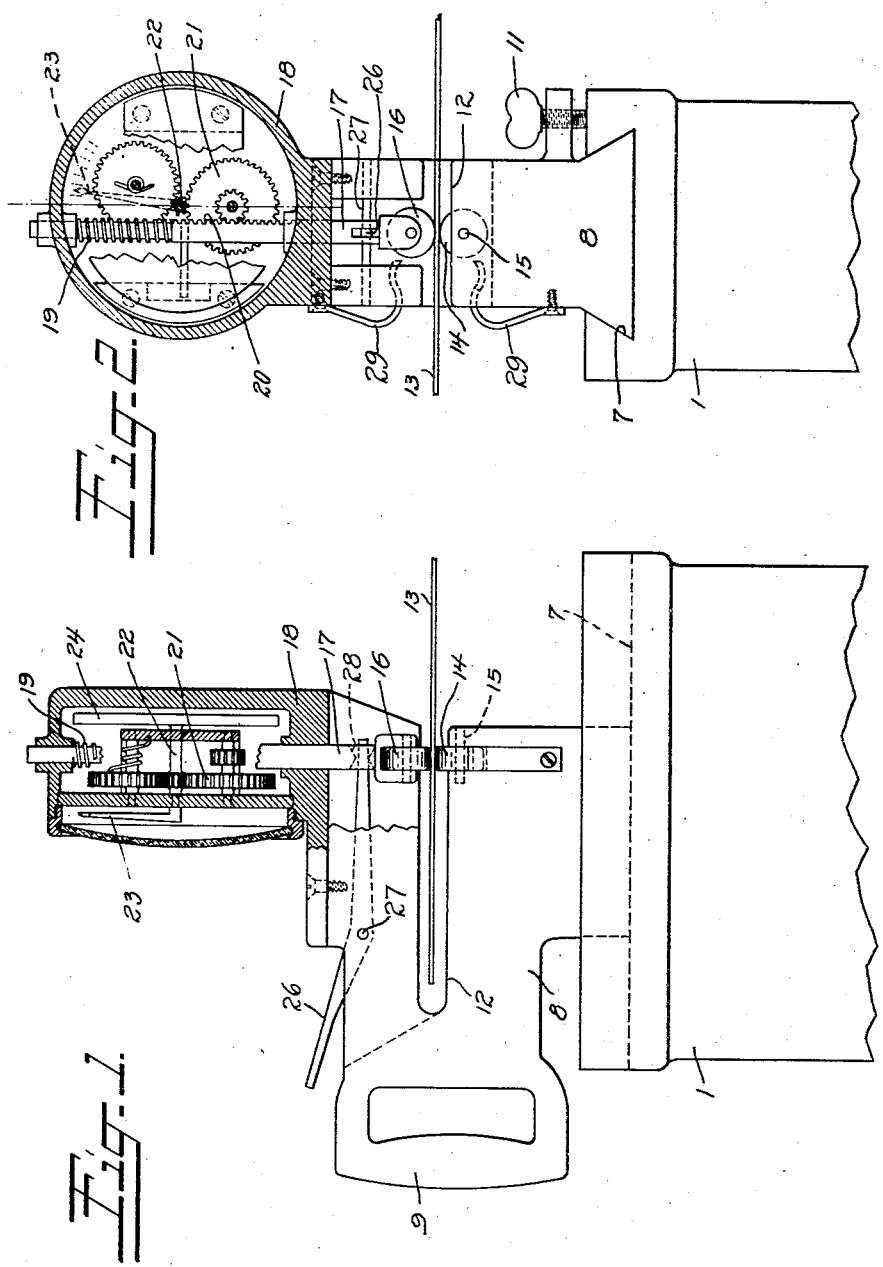
INVENTOR
Adrian O. Abbott, Jr.
BY
Ernest Hopkinson
HIS ATTORNEY A. O. ABBOTT, Jr.
GAUGE.
APPLICATION FILED JUNE 15, 1921.
1,409,907.
Patented Mar. 21, 1922.
2 SHEETS—SHEET 2.
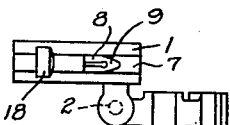
Fig. 4.
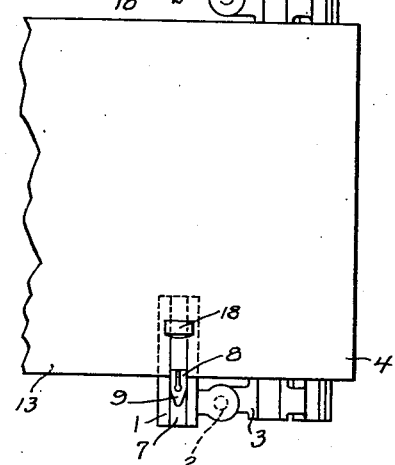
Fig. 3.
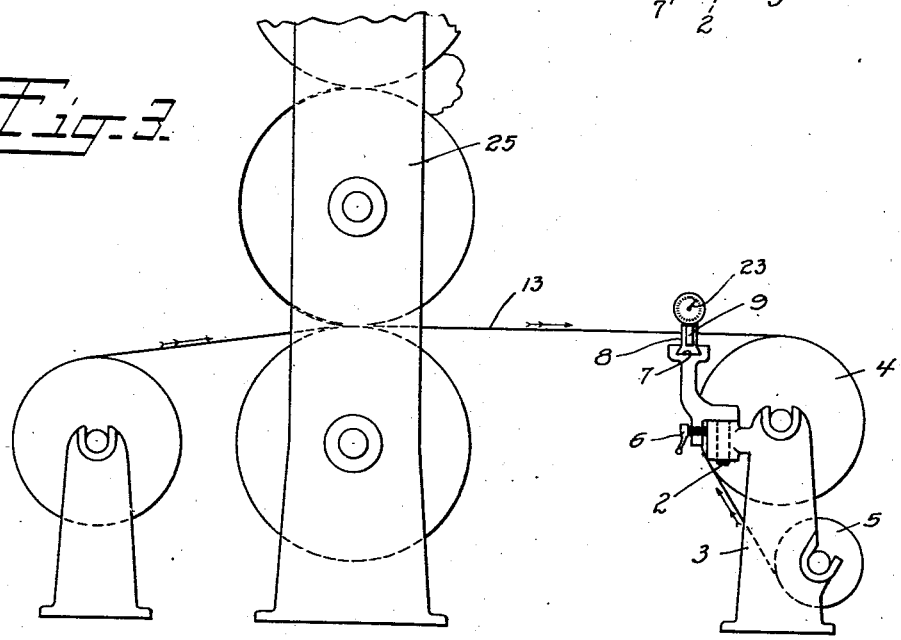
INVENTOR
Adrian O. Abbott, Jr.
BY
Ernest Hopkins
HIS ATTORNEY

UNITED STATES PATENT OFFICE.

ADRIAN O. ABBOTT, JR., OF DETROIT, MICHIGAN, ASSIGNOR TO MORGAN & WRIGHT, A CORPORATION OF MICHIGAN.

GAUGE.

1,409,907.      Specification of Letters Patent.     Patented Mar. 21, 1922.

Application filed June 15, 1921. Serial No. 477,663.

*To all whom it may concern:*

Be it known that I, ADRIAN O. ABBOTT, Jr., a citizen of the United States, residing at Detroit, county of Wayne, and State of Michigan, have invented a certain new and useful Gauge, of which the following is a full, clear, and exact description.

This invention relates to a gauge for measuring the thickness of sheet material and more particularly, for measuring the thickness of rubberized fabric, woven or cord, as it comes from the calendering machine.

Heretofore it has been the practice to cut out pieces of sheet material from the margins from time to time, and to measure them on a gauge having co-operating plate and presser members connected up to the pointer of a dial gauge suitably calibrated. This practice has not been satisfactory. It did not enable the operative to check the thickness of the skim or friction coat applied to the fabric throughout its length. And as the rubberized fabric was subsequently cut into strips to form flies for building into the tire carcass, those strips in the ends of which the incisions had been made had to be squared off to the depth of the incisions. Thus further waste resulted.

Gauges as heretofore constructed could not be applied to a continuously moving sheet material, at least, rubberized woven or cord fabrics used in the manufacture of tires, as the corrugated nature of the woven or cord fabric, particularly the latter, caused the hand or pointer to vibrate to an extent making reliable and accurate reading impossible. The present invention aims to provide a gauge that may be applied to a continuously moving strip of sheet material and that satisfactorily reduces, or eliminates quivering of the pointer.

Briefly, the invention consists in providing a gauge with an inertia member or disc that dampens the oscillations or vibrations of the pointer of the gauge to an extent, at least permitting reliable and accurate readings being made.

A preferred form of the invention is illustrated in the accompanying drawings in which:—

Figs. 1 and 2 are side and front elevations, respectively, partly in section, of the gauge in co-operative relation with a sheet of material, Fig. 3 is a side elevation of the gauge in co-operative relation with a calendering machine, and Fig. 4 is a plan view showing a convenient mounting of the gauge for measuring the thickness at opposite sides of a moving rubberized fabric.

The gauge may be mounted in any convenient manner adjacent one or both sides of a moving strip of material. Preferably, however, it is mounted on a bracket 1 pivoted as indicated at 2 to a boss or lug on a frame 3 supporting the wind-up roll 4 and liner roll 5, a clamp-screw 6 being provided for holding the bracket in either the operative or inoperative positions shown in Fig. 4. The bracket 1 is provided with a groove 7 for the reception of a slide block or base 8 constituting the frame proper of the gauge. The block 8 is provided with a handle 9 for its convenient shift and may have laterally an ear threaded to receive the thumbscrew 11 for holding it in any desired position. The block 8 is also provided with a slot 12 of any suitable depth through which the strip of moving fabric 13 may pass.

An abutment roll 14 is supported on a pin 15 adjacent the lower side of the slot 12 and arranged to co-operate with the roller 16 mounted in the lower end of the stem 17 which is suitably guided in the casing 18, the stem being normally pressed yieldingly downward by a light spring 19. On the stem 17 is fashioned a rack 20 which, through the gears indicated generally at 21, operates a shaft 22 carrying a pointer 23 on one end and a disc 24 on its other end, the latter being steel, brass, or other suitable material adapted by its inertia to substantially eliminate vibrations of the hand 23 when the sheet material has a relatively rough surface like cord tire fabric. To facilitate initial mounting of the gauge with the contacts on opposite sides of a moving sheet of material, means may be provided to lift the roller 16 from its normal contacting relation with the roll 14. Conveniently, this may be done by a lever 26 fulcrumed at 27 to the slide block 8, a free end of the lever being loosely received within an opening 28 provided in the stem 17. Bent springs 29 may also be mounted, as shown and if desired, with their free ends normally spaced from the rolls 14 and 16 and adapted to be sprung into contact therewith so as to scrape them clean should they become coated with the adhesive composition. When the fabric is moving, the pressure of the upper roller 16 is so light that no such coating of its periphery will ordinarily occur, but if the rubberized fabric is halted, particles of the composition may sometimes adhere to the roller 16.

In rubberizing tire fabric, woven or cord, it is customary to apply the skim or friction coats of from 5 to 15 thousandths of an inch in thickness and it is desirable, if not absolutely necessary, to apply the vulcanizable rubber composition to the extent or thickness exactly predetermined from experience. As the fabrics are ordinarily calendered in widths of about six foot, and as the calender, which is indicated at 25 in Fig. 3, is operated rapidly, it will be obvious that there will be considerable waste even if the thickness is increased a few thousandths over what experience has shown satisfactory. Similarly, too thin a coat is objectionable. The right thickness should be applied, neither more nor less.

Owing to the inertia of the metallic disc 24, it is possible with the gauge of the present invention, not only to reliably and accurately read the thickness of the calendered stock passing through it, but to instantly perceive any change from the pre-determined thickness of rubber composition being applied and to correctly adjust the rolls of the calender 25 so as to maintain the thickness of coat wanted.

The invention is capable of various changes and alterations and is not limited to the precise details of construction herein described. Reference should, therefore, be made to the appended claims for an understanding of the scope of the invention.

Having thus described my invention, what I claim and desire to protect by Letters Patent is:

1. A gauge for measuring the thickness of sheet material while moving having an abutment roll whose axis of revolution is fixed, a shiftable roller located vertically in co-operative relation with the roll, indicating mechanism including a pointer, connections between the roller and pointer for operating the latter in accordance with the shift of the roller relative to the roll, and an inertia member connected to said pointer for dampening its vibrations.

2. A gauge for measuring the thickness of sheet material while moving having an abutment roll whose axis of revolution is fixed, a shiftable roller located vertically in co-operative relation with a roll, indicating mechanism including a pointer, connections between the roller and pointer for operating the latter in accordance with the shift of the roller relative to the roll, an inertia member connected to said pointer for dampening the vibrations, and means supporting said roll and roller permitting the same to be moved in the plane of the sheet material into or out of operative measuring relation thereto.

Signed at Detroit, Mich., this 10th day of June, 1921.

ADRIAN O. ABBOTT, Jr.